United States Patent
Chang

(10) Patent No.: US 10,553,095 B2
(45) Date of Patent: Feb. 4, 2020

(54) SAFETY HANDRAIL CAPABLE OF DISPLAYING SUCTION FORCE

(71) Applicant: Shih-Kuo Chang, Tainan (TW)

(72) Inventor: Shih-Kuo Chang, Tainan (TW)

(*) Notice: Subject to any disclaimer, the term of this patent is extended or adjusted under 35 U.S.C. 154(b) by 286 days.

(21) Appl. No.: 15/648,591

(22) Filed: Jul. 13, 2017

(65) Prior Publication Data

US 2019/0019391 A1 Jan. 17, 2019

(51) Int. Cl.
| E04F 11/18 | (2006.01) |
| F16B 47/00 | (2006.01) |
| G08B 21/02 | (2006.01) |
| A47K 3/12 | (2006.01) |

(52) U.S. Cl.
CPC .............. G08B 21/02 (2013.01); E04F 11/18 (2013.01); F16B 47/00 (2013.01); *A47K 3/12* (2013.01)

(58) Field of Classification Search
CPC ......... F16B 47/00; F16B 47/006; E04F 11/18; E04F 11/1802; E04F 11/1804; Y10T 403/20
See application file for complete search history.

(56) References Cited

U.S. PATENT DOCUMENTS

| 5,909,758 | A * | 6/1999 | Kitamura | A47K 3/003 16/406 |
| 7,455,269 | B1 * | 11/2008 | Chien | F16B 47/006 248/205.8 |
| 7,665,706 | B2 * | 2/2010 | Chien | A47K 3/003 248/206.3 |
| 7,753,324 | B2 * | 7/2010 | Chien | A47K 17/022 248/205.8 |
| D639,409 | S * | 6/2011 | Gilbert | D23/304 |
| 7,992,908 | B2 * | 8/2011 | Finck | F16B 47/00 294/187 |
| 8,814,113 | B1 * | 8/2014 | Chen | F16B 1/0071 248/205.5 |
| 8,973,877 | B2 * | 3/2015 | Chen | F16B 47/006 248/205.7 |
| 9,486,111 | B2 * | 11/2016 | Flannery | A47K 17/022 |
| 2006/0231705 | A1 * | 10/2006 | Liu | F16B 47/00 248/205.5 |
| 2013/0075553 | A1 * | 3/2013 | Rautiainen | F16M 13/00 248/205.8 |
| 2014/0263894 | A1 * | 9/2014 | Chen | F16B 47/00 248/205.9 |

* cited by examiner

*Primary Examiner* — Jonathan P Masinick
(74) *Attorney, Agent, or Firm* — Alan D. Kamrath; Karin L. Williams; Mayer & Williams PC

(57) ABSTRACT

A safety handrail contains: a body, two hollow suckers, two sucking disc units, and two display units. The body includes multiple griping portions. Two hollow suckers are fitted on two ends of the body respectively. The two sucking disc units are accommodated in the two hollow suckers separately, and the two display units are symmetrically disposed beside the two hollow suckers respectively. Each of the two display units includes an accommodation chamber having a window and a through hole, each display unit includes a resilient element housed in the accommodation chamber, and each display unit further includes a movable element accommodated in the accommodation chamber. Furthermore, the movable element has a first section, a second section, and a third section passing through the through hole.

3 Claims, 4 Drawing Sheets

SAFETY HANDRAIL CAPABLE OF DISPLAYING SUCTION FORCE

BACKGROUND OF THE INVENTION

Field of the Invention

The present invention relates to a safety handrail which is capable of displaying suction force, wherein when each sucking disc unit draws a wall unstably, a first color (i.e. red) of a movable element is visible through a window of each display unit so as to warn users that the suction force of each sucking disc unit reduces, thus obtaining using safety of the safety handrail.

Description of the Prior Art

A safety sucker contains two conventional warning devices which are connected with a handrail, and the handrail contains a body, two symmetrical press members, two sucking elements, and two symmetrical accommodation grooves, wherein the two symmetrical press members are rotatably fixed on two ends of the body respectively, the two sucking elements are located below the two press members individually, and the two symmetrical accommodation grooves are defined on two sides of the body separately, wherein each of the two warning devices is housed in each of the two accommodation grooves of the handrail. Each warning device is comprised of a casing, a transmission element, a post, a resilient element, at least one limitation block, an alert member, and a column. The casing accommodates the transmission element, the post is mounted below the transmission element, and the resilient element is located above the post and outside the transmission element. Each of the at least one limitation block is arranged above the transmission element and has a plurality of locking recesses formed on one side of each limitation block. The alert member is disposed above each limitation block and has the column fixed on a central portion thereof, and multiple engagement projections are arranged on the column, wherein each of the multiple engagement projections retains with each of the plurality of locking recesses, and the casing is made of translucent material. The alert member of each warning device has a first warning part and a second warning part, wherein the first warning part is green so as to represent safety, and the second warning part is red so as to imply danger.

As a suction force of each sucking element of the handrail diminishes, each warning device makes alert, for example, the resilient element returns to an original position so as to push the post to move outwardly, and each limitation block is pulled downwardly to rotate with the post so that each locking recess engages with each engagement projection, and the alert member is driven to revolve reversely. In the meantime, the second warning part displays on the body in a red color to indicate each sucking element cannot suck a wall securely, thus making alert.

However, the warning device has the follow shortcomings:

1. Each warning device is comprised of the casing, the transmission element, the post, the resilient element, the at least one limitation block, the alert member, and the column. Accordingly, each warning device is complicated and is assembly at high production cost.

2. When the alert member of each warning device revolves reversely, the resilient element pushes the post to move outwardly, each limitation block of the transmission element is pulled downwardly to engage with each locking recess as the column rotate, hence the alert member is actuated to rotate reversely. Therefore, each warning device operates in a complicated manner.

The present invention has arisen to mitigate and/or obviate the afore-described disadvantages.

SUMMARY OF THE INVENTION

The primary objective of the present invention is to provide a safety handrail which is capable of displaying suction force, wherein when each sucking disc unit draws a wall unstably, a first color (i.e. red) of a movable element is visible through a window of each display unit so as to warn users that the suction force of each sucking disc unit reduces, thus obtaining using safety of the safety handrail.

To achieve above-mentioned objective, a safety handrail provided by the present invention contains: a body, two hollow suckers, two sucking disc units, and two display units.

The body includes multiple griping portions. Two hollow suckers are fitted on two ends of the body respectively. The two sucking disc units are accommodated in the two hollow suckers separately, and the two display units are symmetrically disposed beside the two hollow suckers respectively. Each of the two display units includes an accommodation chamber having a window and a through hole, each display unit includes a resilient element housed in the accommodation chamber, and each display unit further includes a movable element accommodated in the accommodation chamber. Furthermore, the movable element has a first section, a second section, and a third section passing through the through hole.

Preferably, the movable element is a column.

Preferably, the first section has a first color coated thereon.

Preferably, the second section has a second color coated thereon.

In operation, when the two sucking disc units of the safety handrail securely draw the wall completely, the first color (i.e. the red) of the movable element hides in the accommodation chamber of each display unit (the resilient element is pressed), while the second color (i.e. the green) of the movable element is visible via the window so as to indicate each of the two sucking disc units draws the wall strongly and safety.

When each sucking disc unit does not draw the wall stably, the first color of the movable element of each display unit is pushed by the resilient element to move below the window, hence the first color (i.e. the red) of the movable element is visible through the window so as to denote each sucking disc unit draws the wall insecurely.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
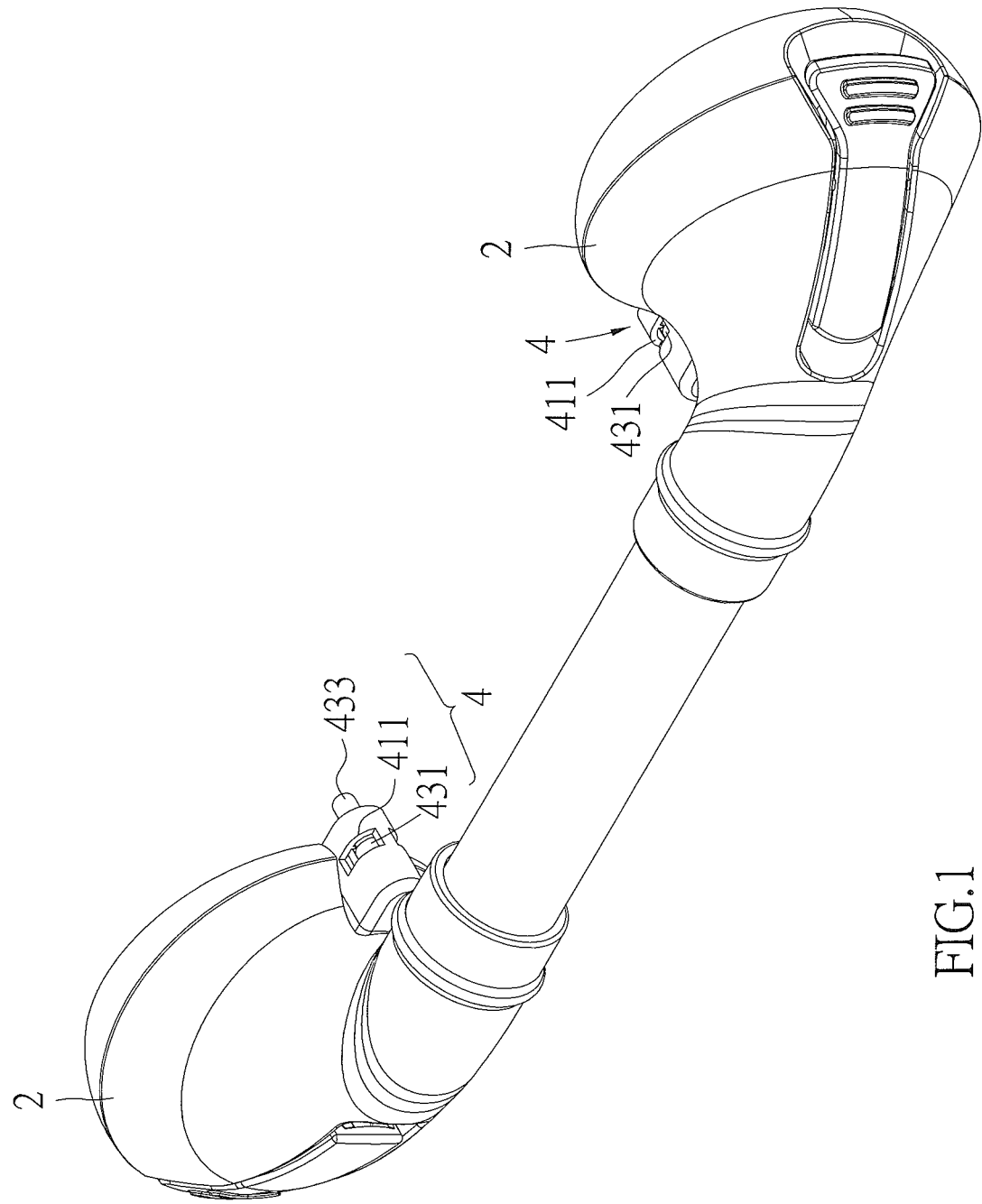
FIG. 1 is a perspective view showing the assembly of a safety handrail according to a preferred embodiment of the present invention.
Figure 2:
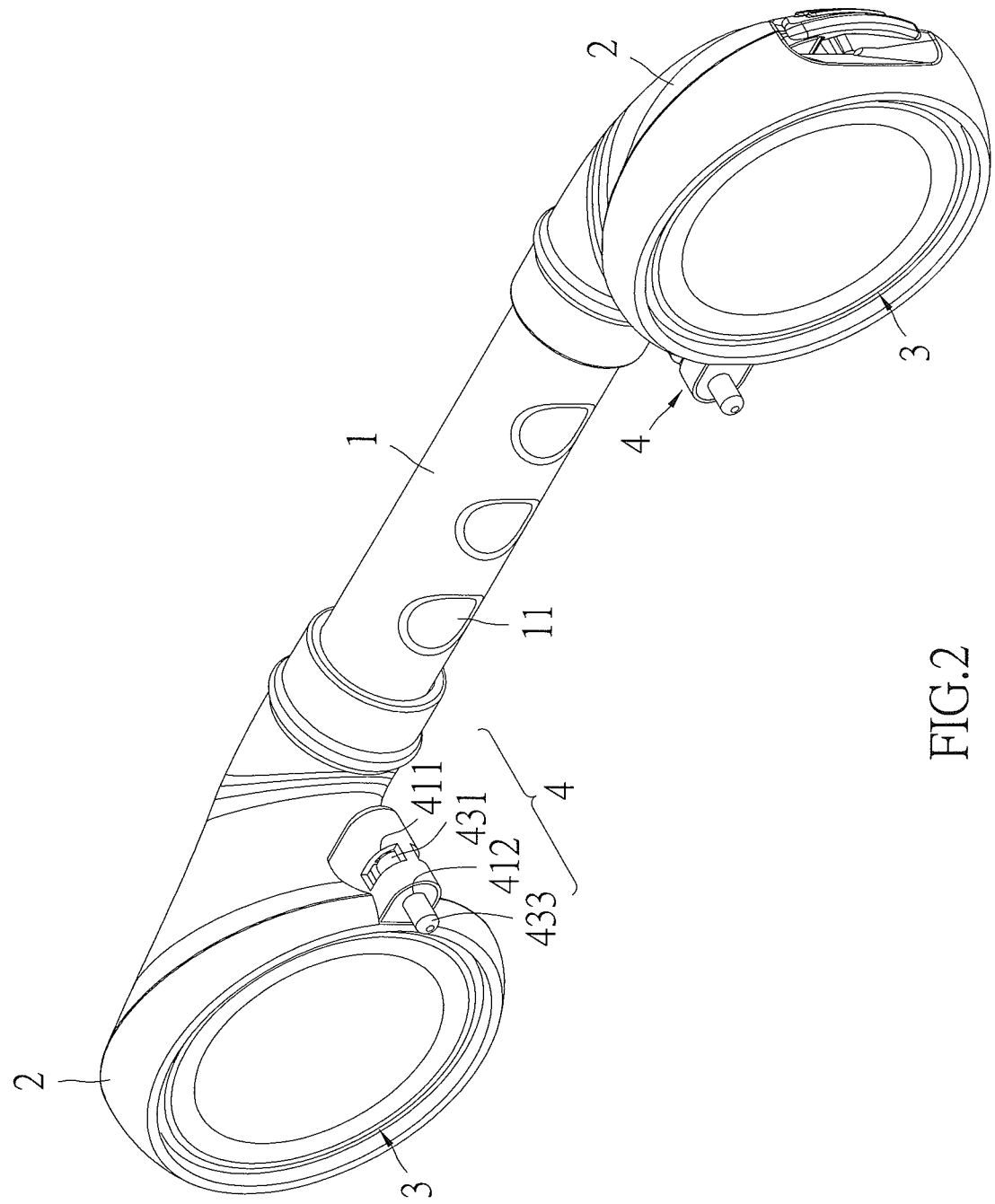
FIG. 2 is another perspective view showing the assembly of the safety handrail according to the preferred embodiment of the present invention.

With reference to FIGS. 1 and 2, a safety handrail capable of displaying suction force according to a preferred embodiment of the present invention comprises:

a body 1 including multiple griping portions 11 and being a hollow tube;

two hollow suckers 2 fitted on two ends of the body 1 respectively;

two sucking disc units 3 accommodated in the two hollow suckers 2 separately.

Figure 3:
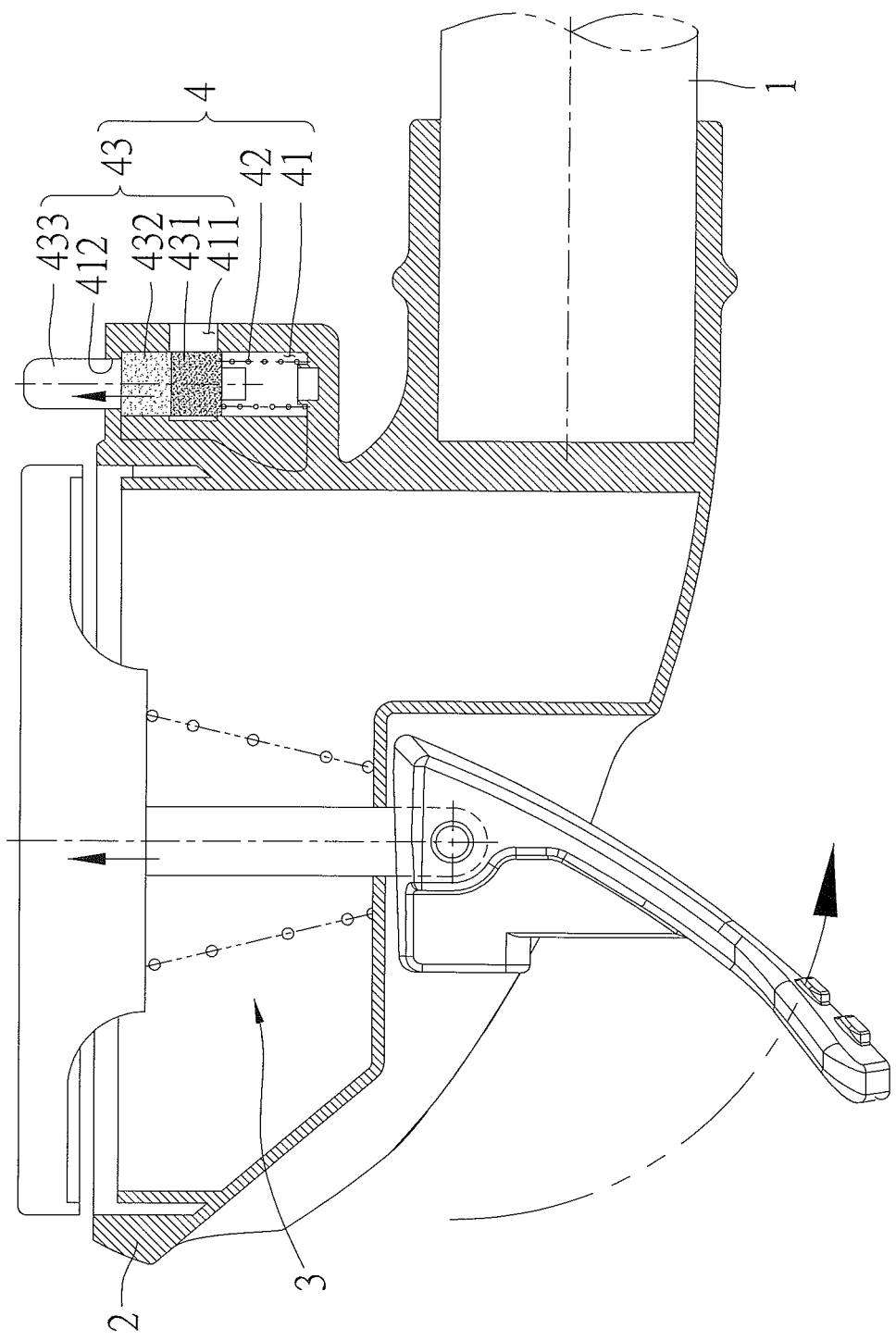
FIG. 3 is a cross sectional view showing the assembly of a display unit of the safety handrail according to the preferred embodiment of the present invention.
Figure 4:
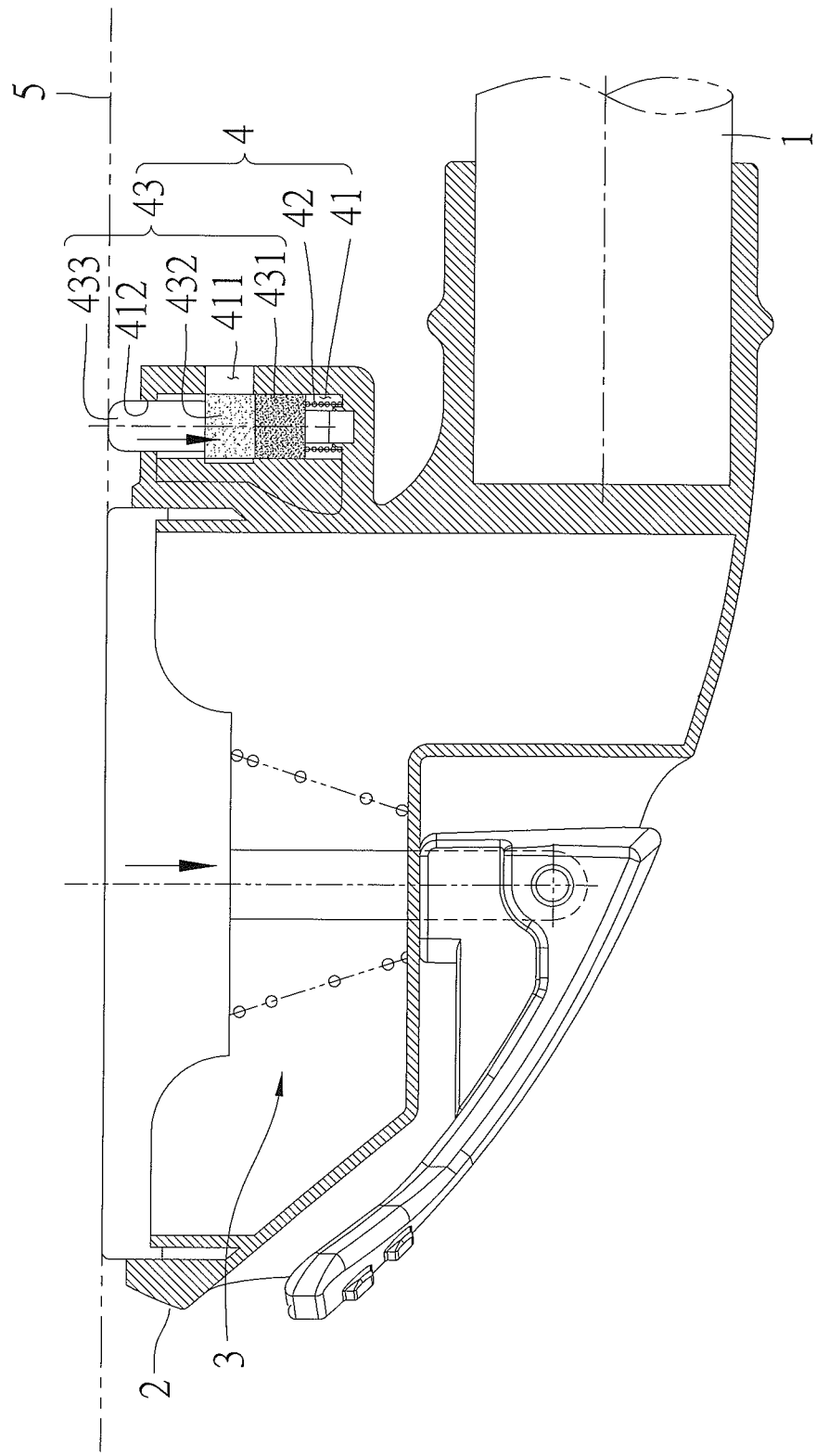
FIG. 4 is a cross sectional view showing the operation of the display unit of the safety handrail according to the preferred embodiment of the present invention.

Referring further to FIGS. 3 and 4, two display units 4 are symmetrically disposed beside the two hollow suckers 2 respectively, wherein each of the two display units 4 includes an accommodation chamber 41 having a window 411 and a through hole 412, and each display unit 4 includes a resilient element 42 housed in the accommodation chamber 41, each display unit 4 further includes a movable element 43 accommodated in the accommodation chamber 41 and fitting with the resilient element 42, wherein the movable element 43 has a first section 431, a second section 432, and a third section 433 passing through the through hole 412. The movable element 43 is a column, the first section 431 has a first color (i.e. red) coated thereon, and the second section 432 has a second color (i.e. green) coated thereon.

As shown in FIG. 4, in operation, when the two sucking disc units 3 of the safety handrail securely draw a wall 5, the third section 433 of the movable element 43 of each display unit 4 abuts against the wall 5 (by which the resilient element 42 is pressed), the first color (i.e. the red) of the movable element 43 hides in the accommodation chamber 41 of each display unit 4, while the second color (i.e. the green) of the movable element 43 is visible via the window 411 so as to indicate each of the two sucking disc units 3 draws the wall 5 strongly and safety.

As illustrated in FIG. 3, when each sucking disc unit 3 does not draw the wall 5 stably, the first color of the movable element 43 of each display unit 4 is pushed by the resilient element 42 to move below the window 411, hence the first color (i.e. the red) of the movable element 43 is visible through the window 411 so as to denote each sucking disc unit 3 draws the wall 5 insecurely.

When each display unit 4 denotes each sucking disc unit 3 draws the wall 5 unstably, the first color (i.e. the red) of the movable element 43 is visible through the window 411 of each display unit 4 so as to warn users that a suction force of each sucking disc unit 3 reduces, thus obtaining using safety of the safety handrail.

Thereby, the safety handrail of the present invention has advantages as follows:

1. Each display unit 4 includes the accommodation chamber, the resilient element, and the movable element, so the safety handrail is simplified and is assembled quickly to lower fabrication cost.

2. When each sucking disc unit draws the wall unstably, the first color (i.e. the red) of the movable element is visible through the window of each display unit so as to warn the users that the suction force of each sucking disc unit reduces, thus obtaining the using safety of the safety handrail.

3. Structural features and technology of each display unit of the safety handrail are new and patentable over prior arts.

4. The movable element of each display unit is movable to indicate the suction force of each sucking disc unit accurately, therefore the safety handrail is in inventive step.

What is claimed is:

1. A safety handrail comprising:
   a body including multiple griping portions;
   two hollow suckers fitted on two ends of the body respectively;
   two sucking disc units accommodated in the two hollow suckers separately; and
   two display units symmetrically disposed beside the two hollow suckers respectively;
   wherein each of the two display units includes an accommodation chamber having a window and a through hole, each display unit includes a resilient element housed in the accommodation chamber, and each display unit further includes a movable element accommodated in the accommodation chamber, wherein the movable element is a column and has a first section, a second section, and a third section passing through the through hole, wherein the moveable element is configured such that when the third section abuts against a wall, the resilient element is compressed and the second section is visible in the window, and further such that when the third section does not abut against a wall, the resilient element is not compressed and pushes the movable element so that the first section is visible in the window.

2. The safety handrail as claimed in claim 1, wherein the first section has a first color coated thereon.

3. The safety handrail as claimed in claim 1, wherein the second section has a second color coated thereon.

\* \* \* \* \*